United States Patent [19]
Woerman et al.

[11] 3,939,916
[45] Feb. 24, 1976

[54] APPARATUS FOR CLEANING TUBEROUS PLANTS

[76] Inventors: Delwin G. Woerman, 521 W. Ash St.; David G. Johnson, P.O. Box 221; Donald F. Murphy, 609 W. Hazel, all of Caldwell, Idaho 83605

[22] Filed: May 19, 1972

[21] Appl. No.: 254,974

[52] U.S. Cl. ................................. 171/18; 171/58
[51] Int. Cl.² .................................... A01D 21/00
[58] Field of Search ............ 171/58, 133, 18; 209/3, 209/12

[56] References Cited
UNITED STATES PATENTS

| | | | |
|---|---|---|---|
| 1,032,175 | 7/1912 | Baas | 171/18 |
| 1,528,502 | 3/1925 | Murphy | 171/133 |
| 1,895,268 | 1/1933 | Silver | 171/18 |
| 2,944,611 | 7/1960 | Rollins | 171/58 |
| 3,010,522 | 11/1961 | Oppel | 171/58 |

Primary Examiner—Russell R. Kinsey
Assistant Examiner—James D. Hamilton
Attorney, Agent, or Firm—John W. Kraft; Charles L. Kraft, II

[57] ABSTRACT

The apparatus for cleaning tuberous plants of this invention comprises a frame, a plurality of digging wheels fastened on the lowermost side of a suitable horizontal framing member at the forwardmost terminal end of the frame, a disk-renk, a belt-renk subassembly, and a discharging subassembly. The disk-renk may include a multiplicity of pentagonally shaped plates fastened on a suitable shaft. The belt-renk subassembly may include a elevating conveyer operable to elevate and to move rearwardly tubers discharged from the disk-renk and a belt-renk disposed parallel to, and substantially beneath, the elevating conveyer, and a upwardly inclined chain conveyer-like belt inclined from its forwardmost terminal end to its rearwardmost terminal end. The chain conveyer-like belt is driven in an upwardly inclined, rearward direction. The discharging subassembly is operable to take plant tubers from the lowermost forwardmost terminal end of the belt-renk and to convey the tubers to a suitable transporting vehicle or similar containing apparatus.

4 Claims, 5 Drawing Figures

APPARATUS FOR CLEANING TUBEROUS PLANTS

FIELD OF INVENTION

The present invention relates to tuberous harvesting apparatus and, more particularly, to tuberous harvesting apparatus operable to separate tuberous plants from tare.

DESCRIPTION OF THE PRIOR ART

Means commonly used and employed to separate tuberous plants from tare and to generally clean earth and debris from tuberous plants have included high-speed flails, planting rollers, and renk bed cleaners. Flails commonly comprise semiflexible flail blades fastened to a suitable shaft driven by a suitable drive train. Flails clean plant tubers by striking the plant tuber, frequently resulting in cuts, cutting, severing, and bruising thereof. Cleaning rollers comprise a pair of rotatable shaft members set in rotating motion, such that the direction of rotation is between the shaft, a semiflexible resilient shaft covering, and a helical rib disposed about the outer circumference of the shaft covering. The helical rib is operable to direct a plant tuber in a rectilinear path along the shaft. The tuber is cleaned by friction and pressure caused by the rotating action of the rollers. In cleaning rollers, exposed bearings may require extensive maintenance, and tubers may become jammed between the rollers causing breakdowns. Renk beds comprise a plurality of shafts, each shaft having a multiplicity of renk stars comprising a plurality of outwardly projecting rigid tines. In operation, each of the shafts in the renk bed is set in the same direction of rotating motion. The plant tuber is cleaned by contact with the rotating renk tines and by agitation caused by the conveyor effect of the renk bed. Frequently, the high relative speed of the tines, with respect to the tuber, may cause cutting of the tuber, and the tuber may become caught between the shafts of the renk bed.

Accordingly, it is an object of the present invention to provide cleaning means for tuberous plants which may gently remove tare, earth, and debris therefrom.

It is a further object of this invention that the cleaning apparatus include a belt for cleaning tare, earth, and debris from tuberous plants, which is configured to protect its drive means and journal bearing means from contact with tuberous plants, tare, earth, and debris.

It is a further object of this invention that the cleaning belt which makes contact directly with the tuberous plants be provided with cleaning means, such as bars and rollers, which are operable to remove tare, earth, and drbris from a tuberous plant without striking the plant.

It is another object of this invention that a primary cleaning means to remove the largest earth, debris, plant tops be provided with pentagonally shaped renk stars.

These and other objects shall become apparent from the description following, it being understood that modifications may be made without affecting the teachings of the invention here set out.

SUMMARY OF THE INVENTION

Generally, the apparatus for cleaning tuberous plants of this invention comprises a frame, a plurality of digging wheels substantially upstandingly mounted to the lowermost side of a suitable horizontal framing member at the forwardmost terminal end of the frame, a disk-renk, a belt-renk subassembly, and a discharging subassembly. The disk-renk may include a multiplicity of pentagonally shaped stars or plates fastened on a suitable shaft. The belt-renk subassembly may include a elevating conveyor operable to elevate and to move rearwardly tubers discharged from the disk-renk and a belt-renk disposed parallel to, and substantially beneath, the elevating conveyor, and a upwardly inclined chain conveyor-like belt inclined from its forwardmost terminal end to its rearwardmost terminal end. The chain conveyor-like belt is driven in an upwardly inclined rearward direction. The discharging subassembly is operable to take plant tubers from the lowermost forwardmost terminal end of the belt-renk and to convey the tubers to a suitable transporting vehicle or similar containing apparatus.

DETAILED DESCRIPTION OF THE PREFERRED EMBODIMENT

Figure 1:
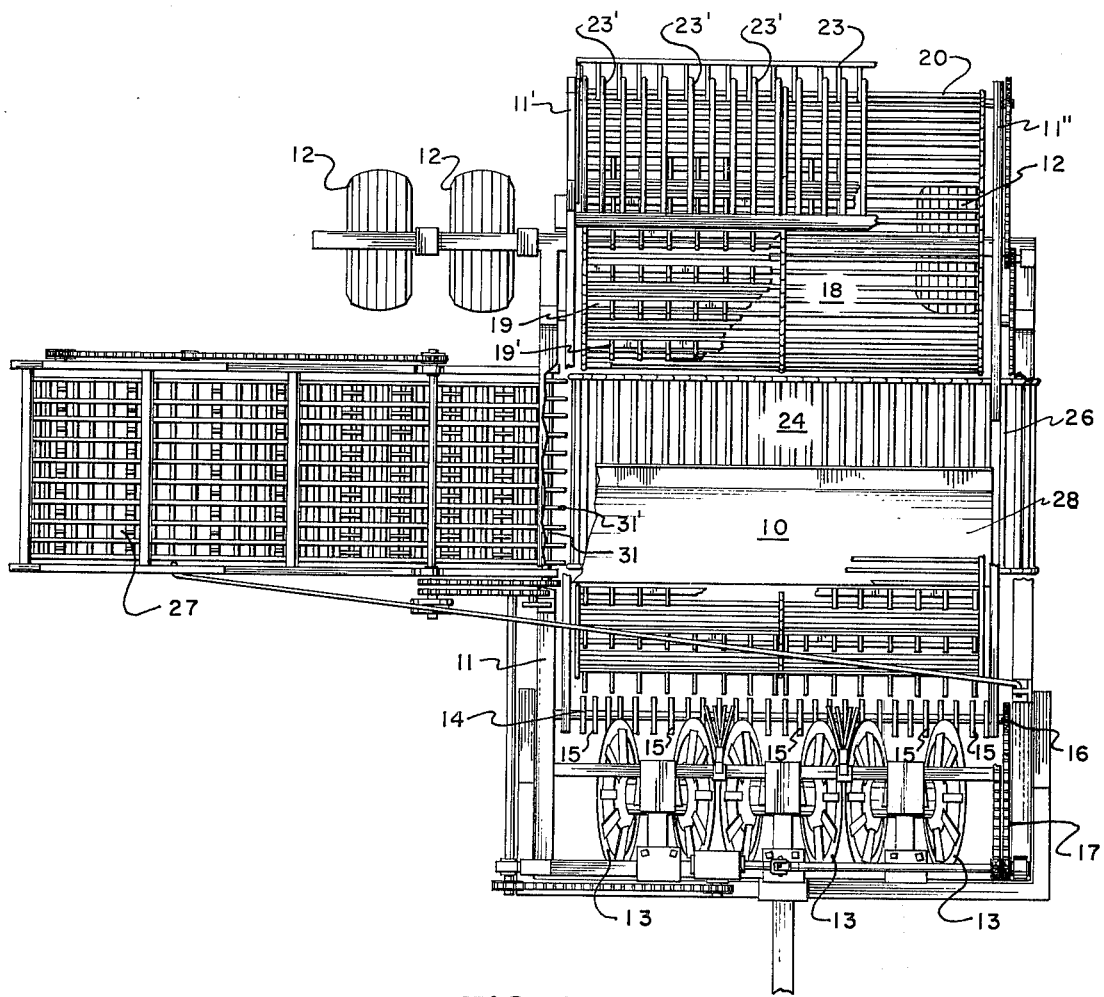
FIG. 1 is a top plan view of the apparatus for cleaning tuberous plants of this invention, including belt and framing portions broken away for illustrative purposes.
Figure 2:
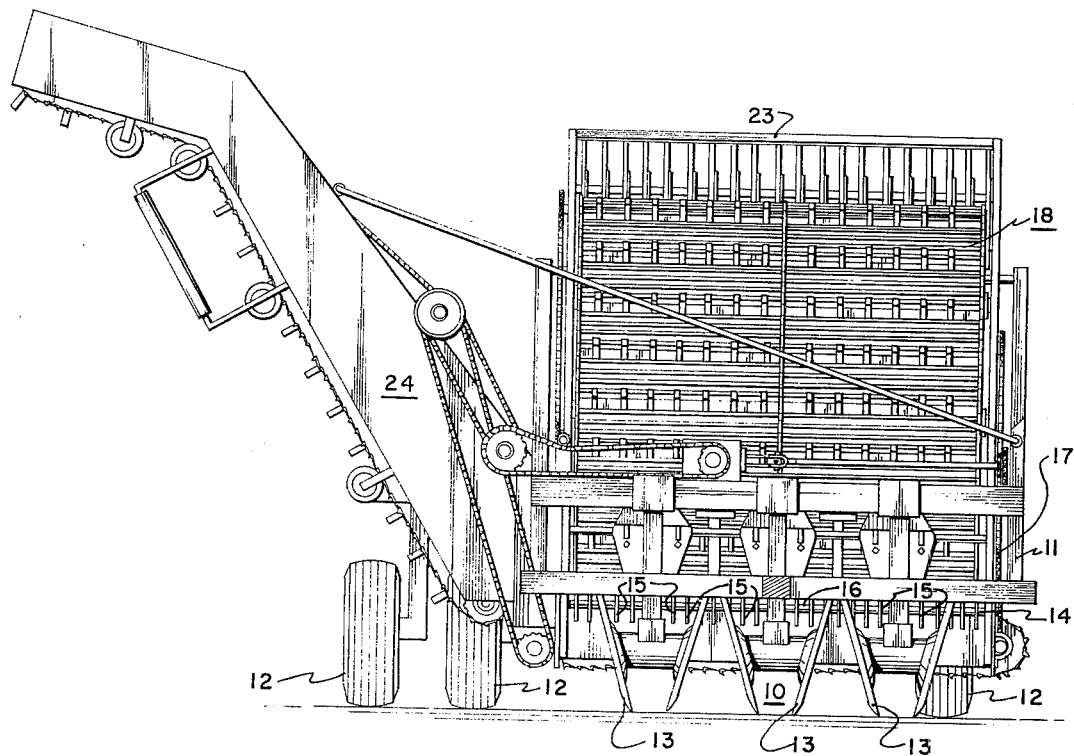
FIG. 2 is a front elevational view of the apparatus for cleaning tuberous plants of this invention.
Figure 3:
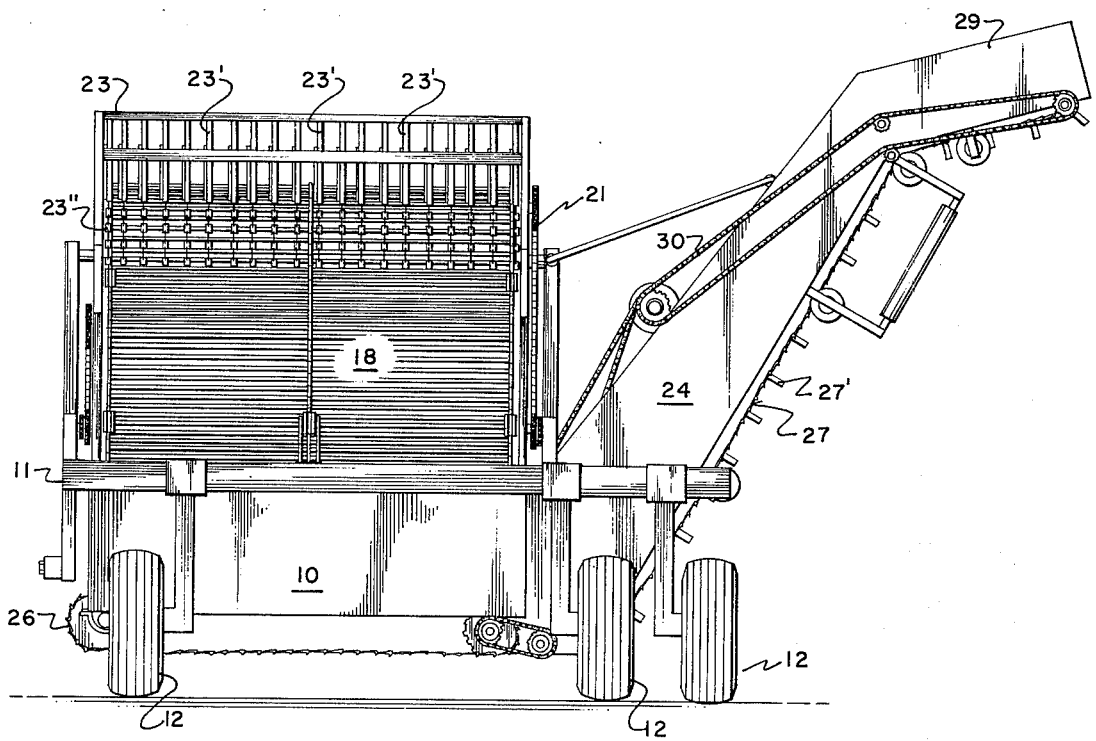
FIG. 3 is a rear elevational view of the apparatus of FIG. 1.

Referring now to the drawings and, more particularly, to the FIGS. 1, 2 and 3, the apparatus for cleaning tuberous plants of this invention is shown to advantage and generally identified by the numeral 10. The apparatus 10 is carried on a suitable frame 11. The frame 11 is provided at each of its sides, distally from its rearwardmost terminal end, with support wheels 12. The forward portion of the frame 11 is provided with a detachable hitching drawbar (not shown) which is operable to suitably join the apparatus of 10 to a commonly known tractor, or similar suitable apparatus (not shown). It is to be understood that the apparatus 10 may be provided with mechanical power from the power-take-off of the tractor or from self-contained drive means. As shown to advantage in the FIGS. 1 and 2, the apparatus 10 includes a plurality of upstandingly mounted digging wheels 13. The wheels 13 are operable to dig plant tubers, such as sugar beets, to collect the tubers from the tare and debris of digging, to elevate the tubers, and to move them rearwardly with respect to the apparatus 10. The wheels 13 may be commonly known, cooperating, rotatable disk-like beet-harvesting wheels.

Figure 4:
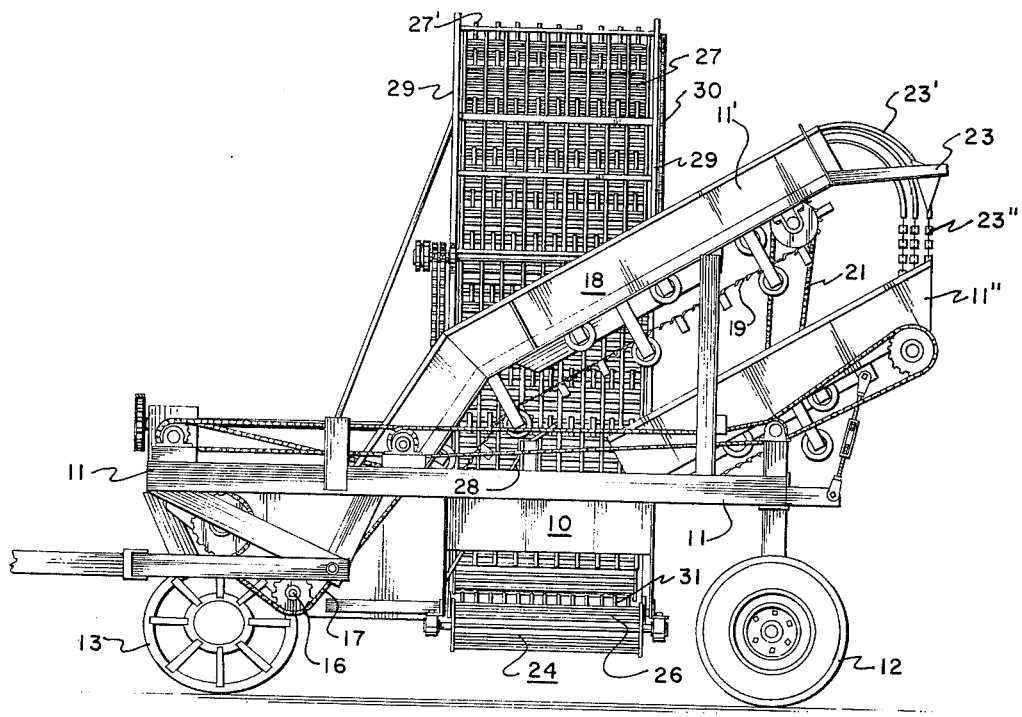
FIG. 4 is a side elevational view of the apparatus for cleaning tuberous plants of this invention.

Referring now to the FIGS. 2 and 4, the apparatus 10 includes a disk-renk 14 which is operable to clean large tare and debris from a plant tuber. The dish-renk 14 comprises a multiplicity of pentagonally shaped plates 15 disposed distally at intervals on a horizontally, transversely disposed shaft 16. The shaft 16 is mounted on the frame 11 by means of journal bearings (not shown). The disk-renk 14 is disposed transversely on the frame 11 distally rearwardly, and below the uppermost arc of the wheels 13. The shaft 16 is driven in a rearward direction of rotation by a sprocket and chain 17. The disk-renk 14 is operable to take plant tubers from the wheels 13 and to carry them rearwardly with respect to the apparatus 10. The sprocket and chain 17 are operable to set the speed of rotation of the plates 15 at such a speed that the tuber is set in a spinning, tumbling motion as it passes over the disk-renk 14. In practice, it has been found to advantage to fabricate the plates 15 in a pentagonal configuration. It is to be understood that the pentagonal configuration is operable to strike tare and debris from the tuber without cutting into the tuber.

Figure 5:
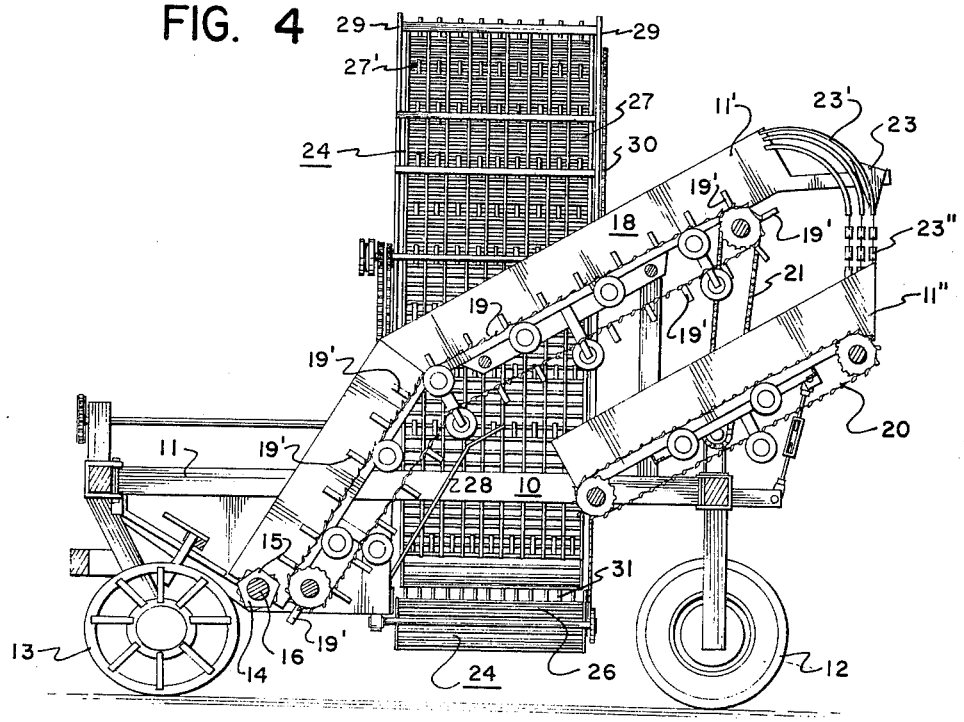
FIG. 5 is a side elevational view of the apparatus of the FIG. 4 shown with the side framing member removed to show the interior configuration thereof.

Referring now to the FIGS. 4 and 5, the apparatus 10 includes a belt-renk subassembly 18. The belt-renk subassembly 18 comprises an elevating conveyor 19 and a belt-renk 20. The elevating conveyor 10 is operable to move tubers passed by the disk-renk 14 and to elevate the tubers above the belt-renk 20. The elevating conveyor 19 may be a chain-type conveyor provided with outwardly projecting elevating studs 19' which are operable to retain the tubers on the elevating conveyor 19. The elevating conveyor 19 is supported by a suitably configured portion of the frame 11. The frame 11 may include upstandingly disposed deflector panels 11' parallelly disposed at each of the terminal sides of the elevating conveyor 19. The elevating conveyor 19 is provided with mechanical power by means of a sprocket and chain 21, similar to sprocket and chain 17. It is to be understood that, by nature, chain-type conveyors provided with mechanical power from a sprocket and chain necessarily have a vibrating characteristic. This vibrating characteristic is useful in cleaning plant tubers.

The renk 20 is disposed parallel to, and substantially beneath, the rearward portion of the elevating conveyor 19. The belt-renk 20 is a chain conveyor-like belt disposed at an upward angle from its forwardmost terminal end to its rearwardmost terminal end. In a fashion similar to the elevating conveyor 19, the belt-renk 20 is provided with upstandingly disposed deflector panels 11'' which are parallelly fastened on a portion of the frame 11 at each of the terminal sides of the renk 20. The belt-renk 20 is provided with mechanical power by means of a sprocket and chain 22, similar to that set out above. The direction of rotation of the belt-renk 20 is in a rearward, upwardly inclined, direction. In operation, tubers discharged from the elevating conveyor 19 fall onto the belt-renk 20, and roll and tumble down the inclined renk over the counteracting belt-renk 20. It is to be understood that the angle of inclination of the belt-renk 20 is operable to overcome the upward force of the links of the belt-renk 20. It has been found to advantage to provide a belt length for the belt-renk 20 which is operable to project rearwardly from the elevating conveyor 19. It has also been found to advantage to provide deflector means 23 to deflect plant tubers thrown from the elevating conveyor 19 onto the renk 20. This deflector means 23 may include a plurality of substantially parallelly disposed, rearwardly projecting, downwardly curved bars 23' fastened to deflector panels 11' above and rearwardly of the rearwardmost terminal end of the elevating conveyor 19. The opening between the lowermost terminal ends of the bars 23' and the uppermost rearwardmost terminal end of the renk 20 may be disposed a plurality of lengths of chain 23'' which may be dependingly fastened from one of their terminal ends to the lowermost end of the bars 23'.

Referring now to the FIGS. 1, 4 and 5, the apparatus 10 includes a discharging subassembly 24. The discharging subassembly 24 is operable to carry tubers to a transporting vehicle, such as a truck and trailer (not shown). The discharging subassembly 24 may comprise a horizontal conveyor 26 and an elevating conveyor 27. The horizontal conveyor 26 may be disposed transversely on the frame 11, and is provided with suitable mechanical power from a sprocket and chain (not shown), similar to that set out above. The horizontal conveyor 26 is disposed beneath the lowermost terminal end of the belt-renk 20. To facilitate the transfer of plant tubers from the renk 20 to the conveyor 26, a deflector wall 27 may be disposed distally forwardly from the forwardmost terminal end of the renk 20 on the frame 11. The elevating conveyor 27 is disposed at the discharging terminal end of the horizontal conveyor 26, and is operable to lift plant tubers onto the transporting vehicle. Similar to the elevating conveyor 19 of the belt-renk subassembly 18, the elevating conveyor 27 is provided at each of the terminal sides with outwardly projecting elevating studs 27' and suitable deflector panels 29. The elevating conveyor 27 is provided with suitable mechanical power by means of a sprocket and chain 30, in the manner set out above. It has been found to advantage to provide a disk-renk 31 between the interfaces of the horizontal conveyor 26 and the elevating conveyor 27 to subject a plant tuber to a final cleaning step before being discharged to a transporting vehicle. The disk-renk 31 is provided with pentagonally shaped plates 31', as set out above with respect to the renk 14. It is to be understood that the transversely disposed discharging subassembly 24 is operable to permit the apparatus 10 to continue to harvest plant tubers while discharging plant tubers onto a transporting vehicle. It is also to be understood that, by this configuration of disk-renks, conveyers, and belt-renks, the apparatus 10 forms a compact mechanical structure operable to facilitate maneuvering in the field.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited to the extent indicated in the appended claims.

We claim:

1. An apparatus for cleaning tuberous plants, comprising
   a frame;
   a plurality of digging wheels substantially upstandingly mounted to the lowermost side of a suitable, horizontally disposed, framing member at the forwardmost terminal end of said frame;
   a disk-renk including a plurality of pentagonally shaped plates fastened on a suitable shaft journally mounted horizontally and transversely on said frame, rearwardly of said digging wheels, said shaft being driven by a suitable drive means;
   a belt-renk subassembly including an elevating conveyor and a belt-renk, said elevating being mounted on suitable framing members of said frame and being operable to elevate and to move rectilinearly rearwardly plant tubers from said disk-renk, said elevating conveyor being driven by suitable drive means similar to said disk-renk, said belt-renk being disposed on a suitable framing member of said frame parallel to and substantially beneath said elevating conveyor, said belt-renk including an upwardly inclined, substantially chain conveyor-like belt being driven by suitable drive means driving said belt-renk in an upwardly inclined rearward direction, the angle of said belt-renk being disposed to suitably reduce downward gravitational travel of a tuber on said belt-renk to overcome the counteracting rearward direction of travel of said belt-renk; and a discharging subassembly being suitable mechanically powered and being carried on said frame, said discharging subassembly having means to collect said tubers discharged from said belt-renk and means to convey said tubers to a transporting vehicle.

2. The apparatus of claim 1, wherein said discharging subassembly comprises a horizontally, transversely disposed conveyer, said conveyer being disposed distally beneath and distally forward of said forwardmost terminal end of said belt-renk, said discharging subassembly including an elevating conveyer operable to elevate and move transversely plant tubers from said horizontal conveyer.

3. The apparatus of claim 2, including a disk-renk comprising a multiplicity of pentagonally shaped plates fastened on a suitable shaft, said shaft being provided with mechanical power from a suitable drive means, said disk-renk being disposed between the interfaces of said horizontal conveyer and said elevating conveyer of said discharging subassembly.

4. The apparatus of claim 1, wherein said plates of said disk-renk are pentagonally configured.

* * * * *